United States Patent [19]
White

[11] Patent Number: 5,233,551
[45] Date of Patent: Aug. 3, 1993

[54] RADIX-12 DFT/FFT BUILDING BLOCK

[75] Inventor: Stanley A. White, San Clemente, Calif.

[73] Assignee: Rockwell International Corporation, Seal Beach, Calif.

[21] Appl. No.: 779,778

[22] Filed: Oct. 21, 1991

[51] Int. Cl.$^5$ .............................................. G06F 15/35
[52] U.S. Cl. .................................................. 364/726
[58] Field of Search ................................ 364/726, 725

[56] References Cited

U.S. PATENT DOCUMENTS 5,093,801  3/1992  White et al. ..................... 364/726

Primary Examiner—Long T. Nguyen
Attorney, Agent, or Firm—H. Fredrick Hamann; George A. Montanye; David J. Arthur

[57] ABSTRACT

Using classic Fast Fourier Transform (FFT) rules, a radix-12 FFT is composed of a first tier of 2 multiplierless radix-6 transformers followed by multiplierless radix-2 transformers, or by its transpose configuration. Complex data are represented in a 1, $W_3$ coordinate system rather than in a classic 1,j coordinate system. The only multiplicative scaler in the complex twiddle factors is the reciprocal of the square root of 3 which appears six times and which by conversion to canonical signed digit code, can be accurately expressed by 5 adds. As a consequence the complex twiddle factor multipliers and ancillary address reduce to a total of 144 real adds required to perform the entire complex 12-point FFT.

18 Claims, 11 Drawing Sheets

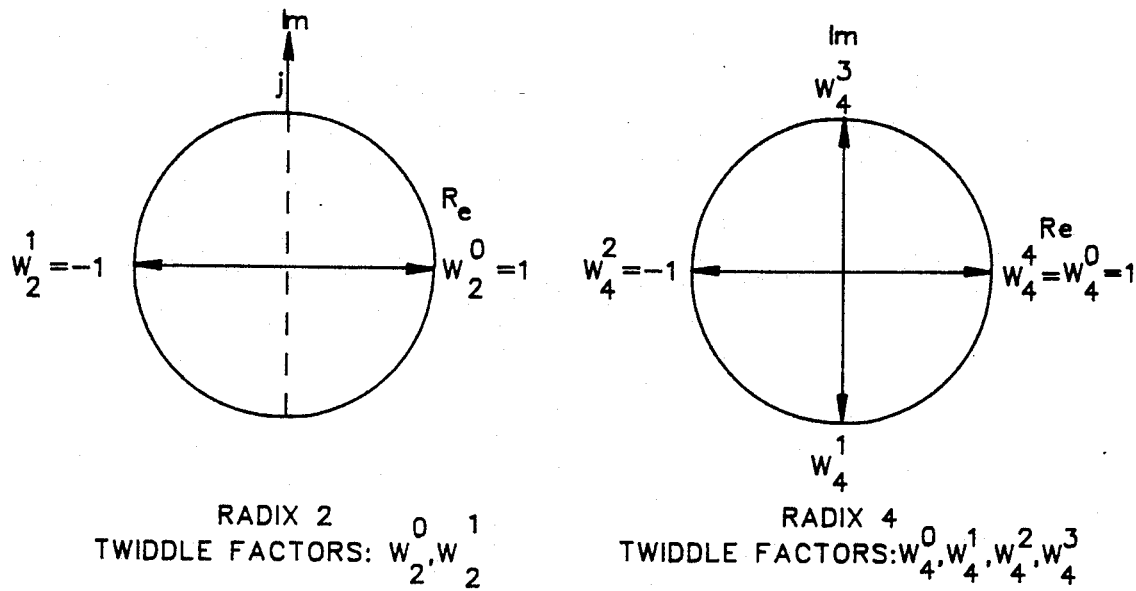
FIG. 5a — RADIX 2 TWIDDLE FACTORS: $W_2^0, W_2^1$
FIG. 5c — RADIX 4 TWIDDLE FACTORS: $W_4^0, W_4^1, W_4^2, W_4^3$
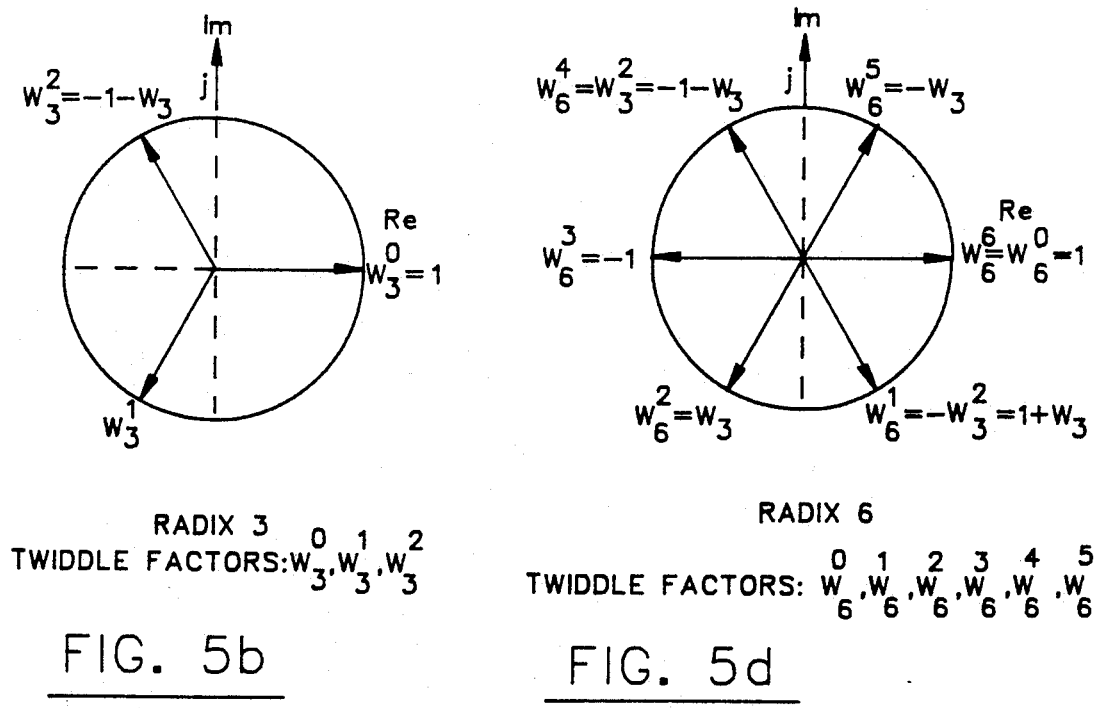
FIG. 5b — RADIX 3 TWIDDLE FACTORS: $W_3^0, W_3^1, W_3^2$
FIG. 5d — RADIX 6 TWIDDLE FACTORS: $W_6^0, W_6^1, W_6^2, W_6^3, W_6^4, W_6^5$

RADIX-12 DFT/FFT BUILDING BLOCK

BACKGROUND OF THE INVENTION

1. Field of the Invention

The present invention relates to signal processing and more particularly to direct and fast Fourier transformations of the 12-point-transform type. The invention further relates to an arrayable, fast-Fourier transformer for accommodating radix-12 transformations at very high speed, over very short epoch times, with minimum system energy expenditure per transform point.

2. Related Technical Art

Direct Fourier Transform (DFT) and Fast Fourier Transform (FFT) signal processors are used in many advanced signal-processing applications requiring analysis of large quantities of sensor data in short time periods. Such applications include signal analysis for target, object, or geographical body recognition; compensating for transfer aberrations in communication signals; and optical data processing. In order to be useful in these and other applications, DFT or FFT signal processors must accommodate large numbers of transforms, or amounts of data, using very short epoch times for processing.

Exemplary requirements or features for advanced signal analysis applications include FDM/TDM signal translation for communication or data processing requiring about 2000 points in 100 μs, and satellite based processor functions ranging from 1000 points in 1.2 μs up to 4000 points in 100 μs. Real-Time image processing typically requires on the order of 1000 data points to be processed in epoch time periods of about 8 μs.

Aside from the speed or data-throughput requirements, power consumption is a major concern for many applications. Power may be supplied by portable generation or storage equipment, such as in space borne processing, where the ultimate power available is limited by many considerations. In such power limited applications, signal processor power consumption must be as low as possible. In addition, larger power consumption also implies larger power dissipation in terms of heat which is also critical to many processor designs. Therefore, new DFT and FFT designs seek to reduce the power consumption per transform per epoch.

Unfortunately, a key problem with any FFT processor is the amount of energy consumed per transform point. Generally high-performance, efficient FFT processors exhibit energy dissipations per transform point in the range of 100 to 1000 times $log_2 N$ nanojoules, where N is the number of points in a given transform. As a consequence, reasonably large transforms required to process large amounts or arrays of data in real time, result in a large power consumption.

Several techniques have been developed in the art to increase the efficiency of the DFT and FFT algorithms or computations in order to reduce the power consumption, as well as provide more efficient circuit structures. One design technique is to create multiply-free computation sub-elements or building blocks which are used to form the desired FFT and increase the computational efficiency. Decreasing the number of multiplications decreases the number of computations required to execute an overall DFT or FFT algorithm. At the same time, there is a corresponding savings in power dissipation from performing fewer computations as well as decreased circuit complexity for associated data transfer, accumulation, and storage elements. Decreasing multiplication operations, especially for complex data, also provides direct manufacturing cost benefits for the circuits, or software, which implement DFT or FFT algorithms and may increase operational reliability.

The Cooley-Tukey radix-2 FFT algorithm, published in 1965, represents the first step in the multiply-free approach, which was advanced in 1966 to a more efficient radix-4 architecture. In 1967, Charles Radar extended this work to a highly efficient, but not multiply-free, radix-8 structure, and in 1978 the radix-3 multiply-free FFT architecture was developed by Dubois and Vetsanopolis, see "A New Algorithm For The Radix-3 FFT," *IEEE TRANS*. VOL. ASSP-26, No. 3, June 1978, pp 222-225. At this point, efficient DFT or FFT analysis could be obtained in powers-of-three and not just powers-of-two. Large FFT or DFT algorithms could now be accommodated more efficiently because the number of total computations required was reduced. However, the radix-3 architecture does require extension into a non-orthogonal coordinate, skew-complex, system in which the radix-4 is no longer multiply free, which limits the overall efficiency for larger FFT point sizes. Finally, in 1981, Prakash and Rao in India introduced a multiply-free radix-6 FFT architecture which increases efficiency over using a combination of radix-2/radix-3 structures for the radix-6 algorithm, see "A New Radix-6 FFT Algorithm," *IEEE TRANS*. VOL. ASSP-29, No. 4, August 1981, pp 939-941.

All of these DFT/FFT architectures allow less complex addressing and control and provide improved computational efficiency due to decreased multiplication requirements. However, as previously indicated, modern signal and data processing requirements call for very large numbers of data and very large DFT or FFT point sizes. While the present state of the art is an improvement, a large number of very small building blocks, and, thus, inter-block transfer computations is still required. It would be useful to have larger point or radix size building blocks into which the very large FFT/DFT algorithms could be efficiently sub-divided. Even though theoretical analysis projects diminishing returns, less decrease per radix size increase, on efficiency beyond the current building block sizes, every increase in efficiency is useful for many power limited applications. In addition, larger more efficient FFT building blocks may have manufacturing and other cost benefit advantages not associated with the theoretical efficiency and not readily apparent to the art.

Therefore, what is needed is a larger radix DFT/FFT building block which is more computationally efficient than the current computational combinations (blocks). It would be an advantage if the new building block architecture employed a very minimum number of multiplications or multipliers with the least amount of complexity in design.

SUMMARY

In view of the above problems associated with the art and desired new features, it is one purpose of the present invention to provide a higher-radix number increased efficiency FFT or DFT building block circuit having lower power consumption.

An advantage of the present invention is that it provides a radix-12 DFT/FFT computation architecture which is more computationally efficient than previous designs.

Another purpose of the present invention is to reduce the number of multiplications required to implement higher-order-radix computations.

Another advantage of the invention is that it provides greater flexibility in configuring complex FFTs into smaller computational elements.

Yet another advantage of the invention is the ease of implementation with proven circuit technology such as 1–2 μm CMOS.

These and other purposes, objects, and advantages are realized in a method and apparatus for performing FFT computations in which twelve data points are received on a series of twelve input lines and processed by a two-tiered structure of six radix-2 Direct Fourier Transformation (DFT) processors which perform radix-2 transformations on two of twelve complex data points, and two radix-6 DFTs which perform radix-6 transformations on six of twelve complex data points, with a series of five twiddle factor elements disposed in-between. The five twiddle factor elements are configured to provide a series of specific phase modifications to the data transferred between the tiers of DFT processors with a maximum of six scalar multiplication operations in preferred embodiments.

The first and second radix-6 DFT processors are connected by six first and second data transfer lines, respectively, to each of the radix-2 DFT processors. The inventive FFT processor generally uses multiplication free radix-2 and radix-6 DFT processor elements and can be configured to use either the radix-2 or radix-6 DFT processors to receive twelve complex input data points and the other set of processors to provide the requisite twelve output data points.

In one embodiment, the first twiddle factor element is connected in series with the second transfer line of the second radix-2 DFT and adjusts complex data points by subtracting the imaginary portion from twice the real portion of complex input data and decreasing the result by a factor of the square root of three to form real output data. The first factor element also sums the real and imaginary input data and decreases the resulting addend by the square root of three to form imaginary output data. The second twiddle factor element is connected in series with the second transfer line of the third radix-2 DFT and provides the sum of the real and imaginary input data as real output data, and the real input data as imaginary output data. The third twiddle factor element is connected in series with the second transfer line of the fourth radix-2 DFT and provides the real data minus twice the imaginary input data decreased by a factor of the square root of three as real output data, and provides twice the real data minus the imaginary input data decreased by the square root of three as imaginary output data. The fourth twiddle factor element is connected in series with the second transfer line of the fifth radix-2 DFT and transfers the negative of imaginary input data as real output data, and provides the real minus the imaginary input data as imaginary output data. Finally, the fifth twiddle factor element is connected in series with the second transfer line of the sixth radix-2 DFT and provides the negative of the sum of the real and imaginary input data decreased by a factor of the square root of three as real output data, and provides the real minus twice the imaginary input data decreased by the square root of three as imaginary output data.

The first, third, and fifth twiddle factor elements employ dividers for dividing appropriate addends by a factor of the square root of three or multipliers for multiplying by the reciprocal of the square root of three, as desired for specific manufacturing implementations. Alternatively, the first, third, and fifth twiddle factor elements employ canonical signed data shifting elements to apply appropriate signed digit shifts of sufficient magnitude to decrease the addends by a factor of the square root of three. In addition, the first, third, and fifth twiddle factor elements use a first digital data shifter as a doubling element to apply a one place shift to the appropriate real and imaginary input data values to achieve the desired factor of two increase. Otherwise, multipliers would be required for this latter operation, which is less efficient.

In further aspects of the invention, the first twiddle factor element uses a first summation element to subtract imaginary input data from doubled real input data, and a first multiplication element to apply the reciprocal of the square root of three to the first addend to form the real portion of output data. The first factor element also uses a second summation element to sum the real and imaginary input data and a second multiplication element to apply the reciprocal of the square root of three to the resulting addend to form the imaginary portion of output data.

The second twiddle factor element uses a third summation element to sum the real and imaginary portions of complex input data to form real output data, and a first transfer element to transfer the real portion of input data as an imaginary portion of output data.

The third twiddle factor element uses a fourth summation element to subtract doubled imaginary input data from the real portion of the input data. A third multiplication element is used to apply the reciprocal of the square root of three to the output of the fourth summation element to form real output data. A fifth summation element subtracts imaginary input data from twice the real input data. A fourth multiplication element generates the product of the inverse of the square root of three and the output of the fifth summation element to form imaginary output data.

The fourth twiddle factor element uses a second transfer element to transfer the negative of the imaginary input data as real output data, and a sixth summation element to subtract imaginary input data from real input data to form imaginary output data.

The fifth twiddle factor element uses a seventh summation element to sum the real and imaginary portions of the complex input data and a negation element to form the negative thereof. A fifth multiplication element forms the product of the inverse of the square root of three and the output of the negation element as a real portion of output data. An eighth summation element subtracts twice the imaginary input data from the real input data, and a sixth multiplication element applies the reciprocal of the square root of three to the resulting addend to form imaginary output data.

The outputs from the five twiddle factor elements are subsequently transferred along the five individual "second transfer lines" to the radix-6 or radix-2 processors to which they are connected, depending upon input configuration, for processing into the final twelve point output format. This structure advances the art by providing a radix-12 FFT which requires fewer multiplication steps and can be configured to eliminate all multiplication elements in some embodiments.

BRIEF DESCRIPTION OF THE DRAWINGS

The novel features of the present invention may be better understood from the accompanying description when taken in conjunction with the accompanying drawings in which like numbers refer to like elements, and in which:

FIGS. 5a, 5b, 5c, and 5d, illustrate the relationships between axes for radix-2, radix-3, radix-4, and radix-6 orthogonal systems, respectively;

DETAILED DESCRIPTION OF A PREFERRED EMBODIMENT

Figure 1:
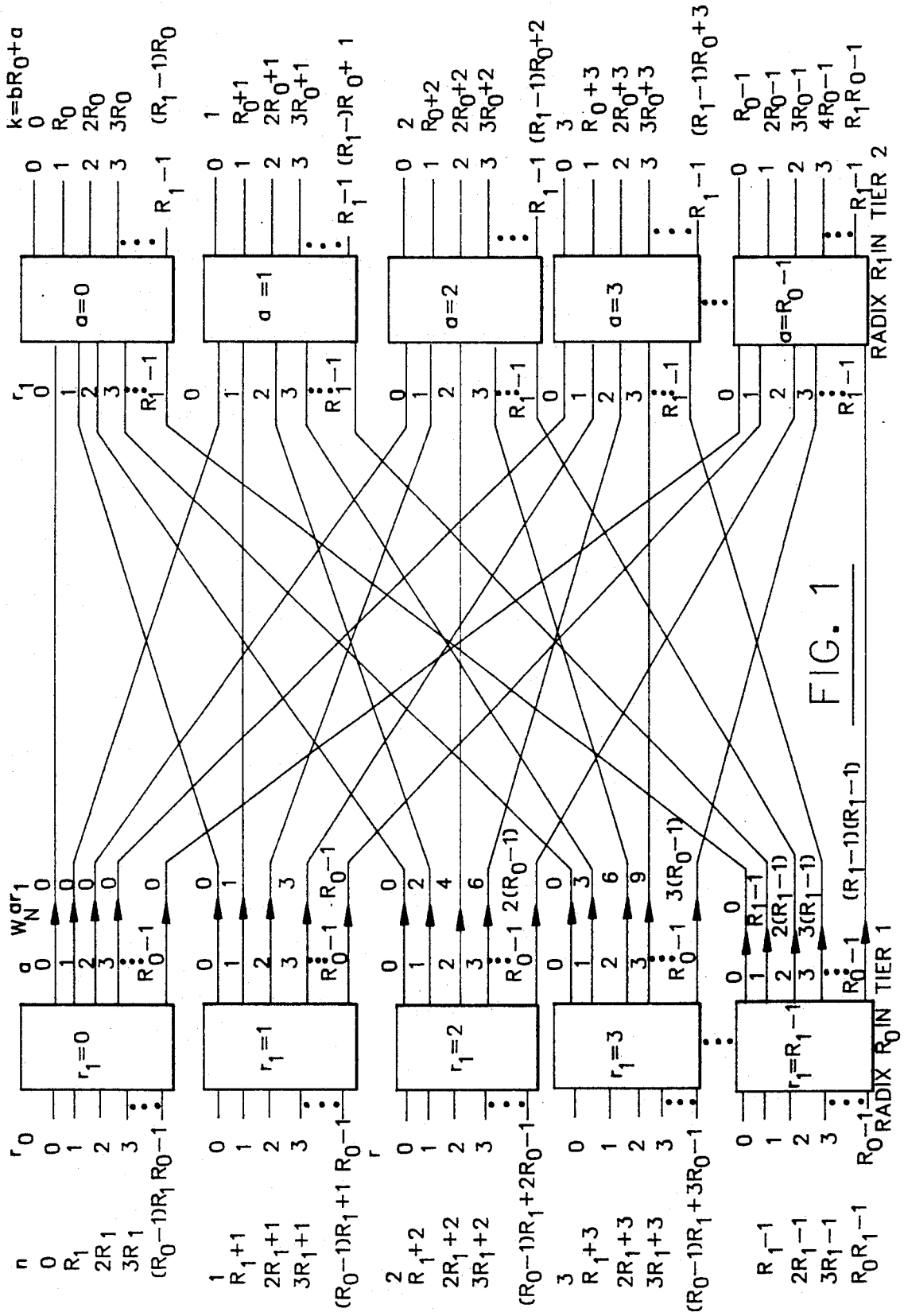
FIG. 1 illustrates an overview of decomposition of an N-point transform DFT into an $R_0$- and $R_1$-point two-tier FFT structure.

The present invention provides a method and apparatus for performing radix-12 FFT computations in a modular DFT building block which requires fewer multiplications per input point than the current art. Improved computational efficiency results in lower energy consumption per transform point which translates to improved power consumption over very small epoch times. The radix-12 device of the present invention can be manufactured using mature off-the-shelf manufacturing technology and allows greater flexibility in configuring complex FFTs into smaller computational elements. These advantages are accomplished by decomposing a radix-12 FFT into one tier of six radix-2 DFT/FFTs and one tier of two radix-6 DFT/FFTs. A preselected set of five twiddle factor operations are applied to the intermediate computational results being transferred between the two tiers or sets of DFTs. The application of the unique, minimum multiplications, twiddle factor operations allows a reduction in the number of multiplications per point by a factor of at least four (24 total to 6). In addition, a further reduction can be obtained by using shifting and CSDC for some operations.

As discussed above, major problems with FFT processors are speed and the consumption of power. These problems arise partially from the energy and time required to move data into and out of remotely located memory structures and the transfer of various control signals to effect processing. However, a major source of energy consumption is the large number of multiplication operations that must be accomplished to compute DFT or even more efficient FFT algorithms. As will be illustrated below, the transformation of data between the time and frequency domains involves a series of phase adjustments requiring complex multiplication. Each complex multiplication requires on the order of four real multiplications to implement, which leads to a very large number of multiplications in even medium sized DFT/FFT signal processing applications.

The design goal for the FFT processor of the present invention is similar to that of the FFT structures for performing radix-2, -3, -4, or -6 transformations discussed previously. The new DFT/FFT design is intended to reduce the total number of multiplications while providing a larger radix building block for accommodating large arrays of data. While multiplier free radix-2 and -3 FFT circuitry allows N-point FFTs of size $2^n 3^m$ points to be performed, through combination, a larger radix size represents an additional efficiency. In addition, the radix-4 and radix-3, -6 FFTs cannot be easily combined into radix-12 processors due to the use of mutually exclusive orthogonal versus skew-complex axes in manipulating the data in these FFTs. A single radix-12 processor module would overcome this limitation. A radix-12 processor also overcomes the inherent limitations found in trying to force all computations into a radix-2 based structure.

The implementation of the present invention is accomplished using a decomposition rule that allows the decomposition of complex transformations into smaller point size transformations which are then distributed over smaller radix-sized blocks. The small radix transformations are easily implemented in specialized, dedicated, structures operating at very high speeds and the transformation results combined using modular memory and accumulation circuitry.

It is well established that an N-point Direct Fourier Transformation (DFT) can be decomposed into a set of smaller point size DFTs, X and Y, when the point size N is factorable into smaller non-negative integers (N=XY). A decomposition of N into XY results in one transformation rank or tier of X DFTs having Y points each (radix-Y) and one tier of Y DFTs of X points each (radix-X). For each output of the first rank there is a unique input to the second rank which also has a complex multiplication associated with it which implements a phase shift known as a "twiddle factor" (phase-shifting complex-weighting coefficients). The X and Y DFTs can also be further decomposed until their values are prime numbers.

Where there are $x_n$ input time samples of data resulting in $X_k$ output frequency samples from the DFT, and the twiddle factors employed are stated as $W_N^{nk} = e^{-2\pi j n k / N}$, the DFT is expressed by the relationship:

$$X_k = \sum_{n=0}^{N-1} x_n W_N^{nk} \tag{1}$$

where N is the number of both the input and output samples.

Polynomial substitution (trinomials in this case) on the subscripts n and k can be used to decompose this DFT into smaller radix (point size) DFTs. For example, to decompose a given radix value N into three smaller radix values $R_0$, $R_1$, and $R_2$, (series of smaller $R_0$-, $R_1$-, and $R_2$-point transforms) where $N = R_0 R_1 R_2$, one can use the expressions:

$$n = r_0R_1R_2 + r_1R_2 + r_2 \quad a, r_0 = 0, 1, 2, \ldots, R_0 - 1$$
$$k = cR_0R_1 + bR_0 + a \quad b, r_1 = 0, 1, 2, \ldots, R_1 - 1$$
$$N = R_0R_1R_2 \quad c, r_2 = 0, 1, 2, \ldots, R_2 - 1$$

and equation 1 becomes:

$$X_{cR_0R_1+bR_0+a} = \sum_{r_0=0}^{R_0-1} \sum_{r_1=0}^{R_1-1} \sum_{r_2=0}^{R_2-1} (W_N^{(cR_0R_1+bR_0+a)(r_0R_1R_2+r_1R_2+r_2)} x_{r_0R_1R_2+r_1R_1+r_2}) \quad (2)$$

This equation can be reduced using substitutions for the various terms such as:

$$W_N^{cR_0R_1r_0R_1R_2} = W_N^{cR_0R_1r_1R_2} = W_N^{bR_0r_0R_1R_2} = 1; \quad W_N^{cR_0R_1r_2} = W_{R_2}^{cr_2};$$

$$W_N^{bR_0r_1R_2} = W_{R_1}^{br_1}; \quad W_N^{ar_0R_1R_2} = W_{R_0}^{ar_0}; \quad W_N^{ar_1R_2} = W_{R_0R_1}^{ar_1}; \quad W_N^{br_2R_0}W_N^{ar_2} = W_N^{(bR_0+a)r_2};$$

to the form:

$$X_{cR_0R_1+bR_0+a} = \sum_{r_2=0}^{R_2-1} \left[ W_{R_2}^{cr_2} W_N^{(bR_0+a)r_2} \sum_{r_1=0}^{R_1-1} W_{R_1}^{br_1} \left( W_{R_0R_1}^{ar_1} \sum_{r_0=0}^{R_0-1} W_{R_0}^{ar_0} x_{r_0R_1R_2+r_1R_2+r_2} \right) \right] \quad (3)$$

The above equation (3) can be used to generate a three, or more, tier structure of transformations or discrete transformation "blocks" to mechanize the computation of an N-point FFT. The size of the transforms in the first tier is $R_0$, and the size of the transforms in the second and third tiers are $R_1$ and $R_2$, respectively. Each transformation block in the first tier has inputs $r_0=0$ through $R_0$-1, and outputs $a=0$ through $R_0$-1. Each first tier discrete transformation block is identified by the terms $r_1, r_2$ which vary from 0 to $R_1$-1 and $R_2$-1 respectively. Where there are a series of input data samples $x_0, x_1, \ldots x_{n-1}$, they are assigned to the transformation inputs according to the definition of n given above.

In the second tier, with transform size $R_1$, each transformation block is identified by the terms $r_2$ and a. Here the inputs are $r_1=0$ through $R_1$-1. Therefore, each first tier output is designated by $r_1, r_2$, the block number, and a, the output for a given block. The corresponding input to the second tier being specified by $r_2$ and a, the block numbers, and $r_1$, the input number. The twiddle factor for the first tier output is given by:

$$W_{R_0R_1}^{ar_1} = e^{-j2\pi ar_1/R_0R_1} \quad (4)$$

The third tier has blocks identified by the terms b and a. The inputs for each block are $r_2=0$ through $R_2$-1 and the outputs are $c=0$ through $R_2$-1. The inputs are $r_2=0$ through $R_2$-1 and the outputs from each block are $c=0$ through $R_2$-1. Each second tier output is designated by $r_2$ and a, the block numbers, and b, the output for a given block. The corresponding input to the third tier being specified by b and a, the block numbers, and $r_2$, the input number. The twiddle factor for the second tier output is given by:

$$W_N^{(bR_0+a)r_2} = e^{-j2\pi(bR_0+a)r_2/N} \quad (5)$$

If c, $r_2$, and $R_2$ are set equal to 0 then the transformation is subdivided into a two-tier structure and equation 3 becomes:

$$X_{bR_0+a} = \sum_{r_1=0}^{R_1-1} W_{R_1}^{br_1} \left( W_{R_0R_1}^{ar_1} \sum_{r_0=0}^{R_0-1} W_{R_0}^{ar_0} x_{r_1R_2+r_2} \right) \quad (6)$$

This equation describes the parameters of a two-tier FFT structure an example of which is illustrated in block diagram form in FIG. 1. From these examples, it is clear that any larger transformation size requirement of two raised to an integer power can be constructed from a series of 2- or 4-point FFTs. At the same time, it is readily apparent that using 3- and 6-point FFT building blocks allows the construction of FFT processors which accommodate three or six raised to an integer power number of point, and combinations of radix-2 and radix-3 or -6 also provide additional FFT point sizes.

FFT structures constructed using the above decomposition analysis nominally employ complex twiddle factor multiplication operations on every input or output (decimation-in-time or decimation-in-frequency) line between processing tiers. This requires four multiplications per line to implement. However, when using decomposition, the number of multiplications can be greatly reduced where radix-2, -3, -4, and -6 elements are used since these FFTs can be implemented as specialized multiplication free structures, as previously discussed.

Figure 2:
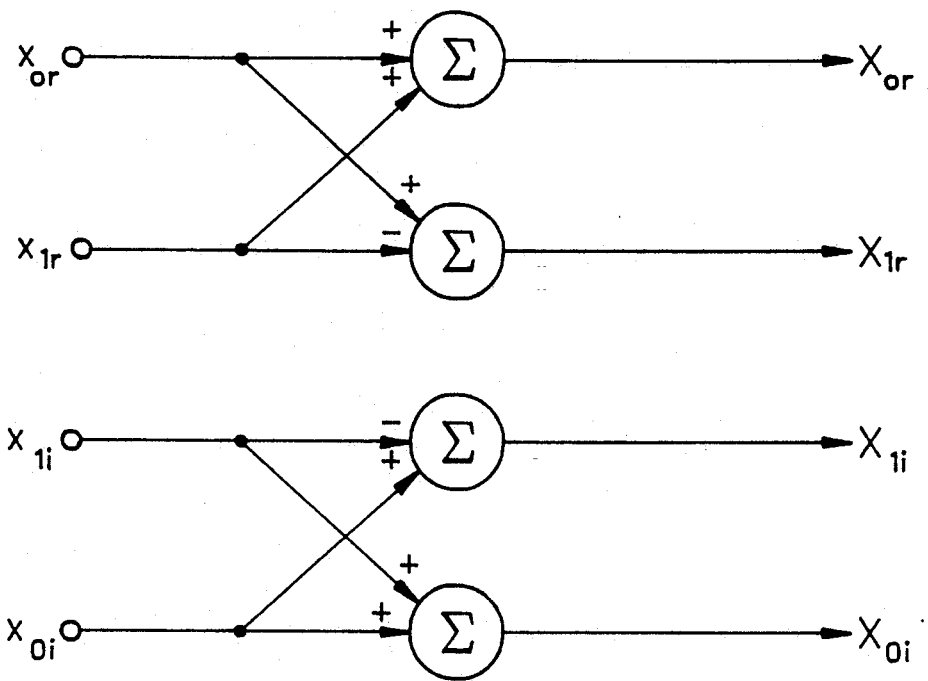
FIG. 2 illustrates the functional operation of a multiplier free radix-2 DFT.
Figure 3:
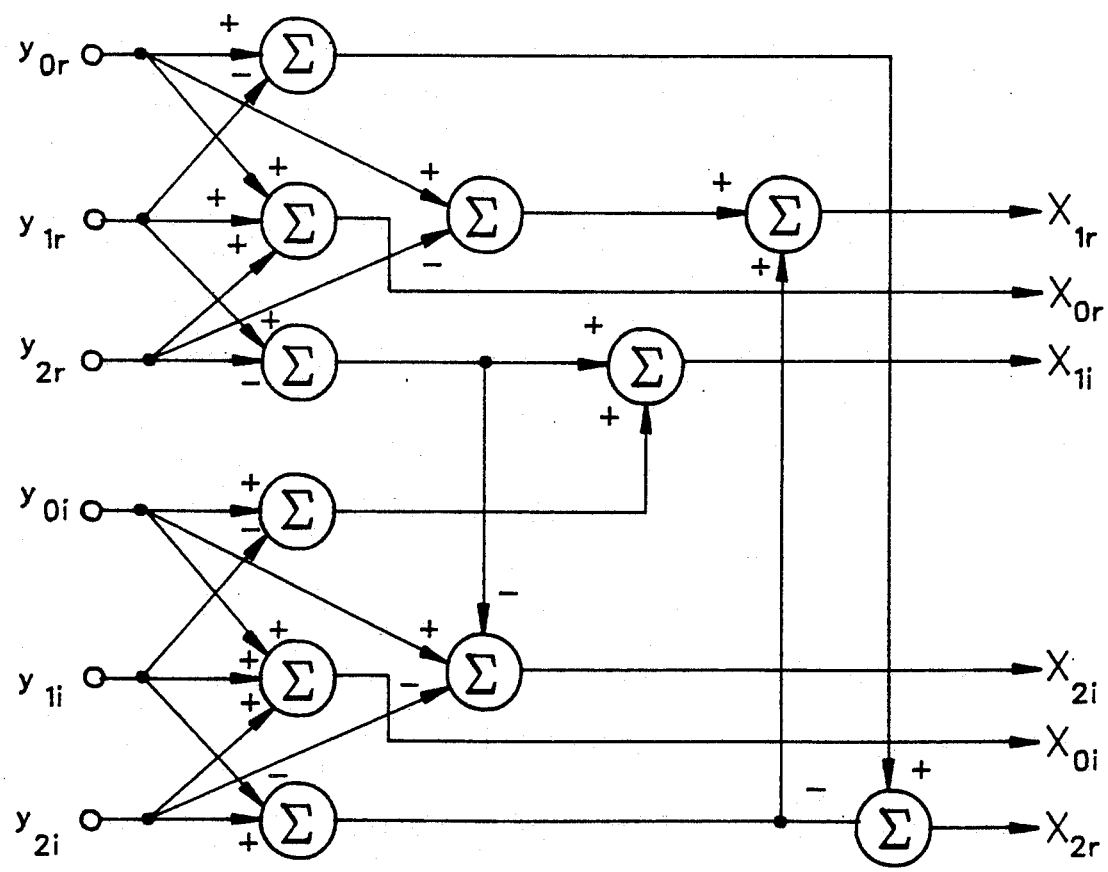
FIG. 3 illustrates the functional operation of a multiplier free radix-3 DFT.
Figure 4:
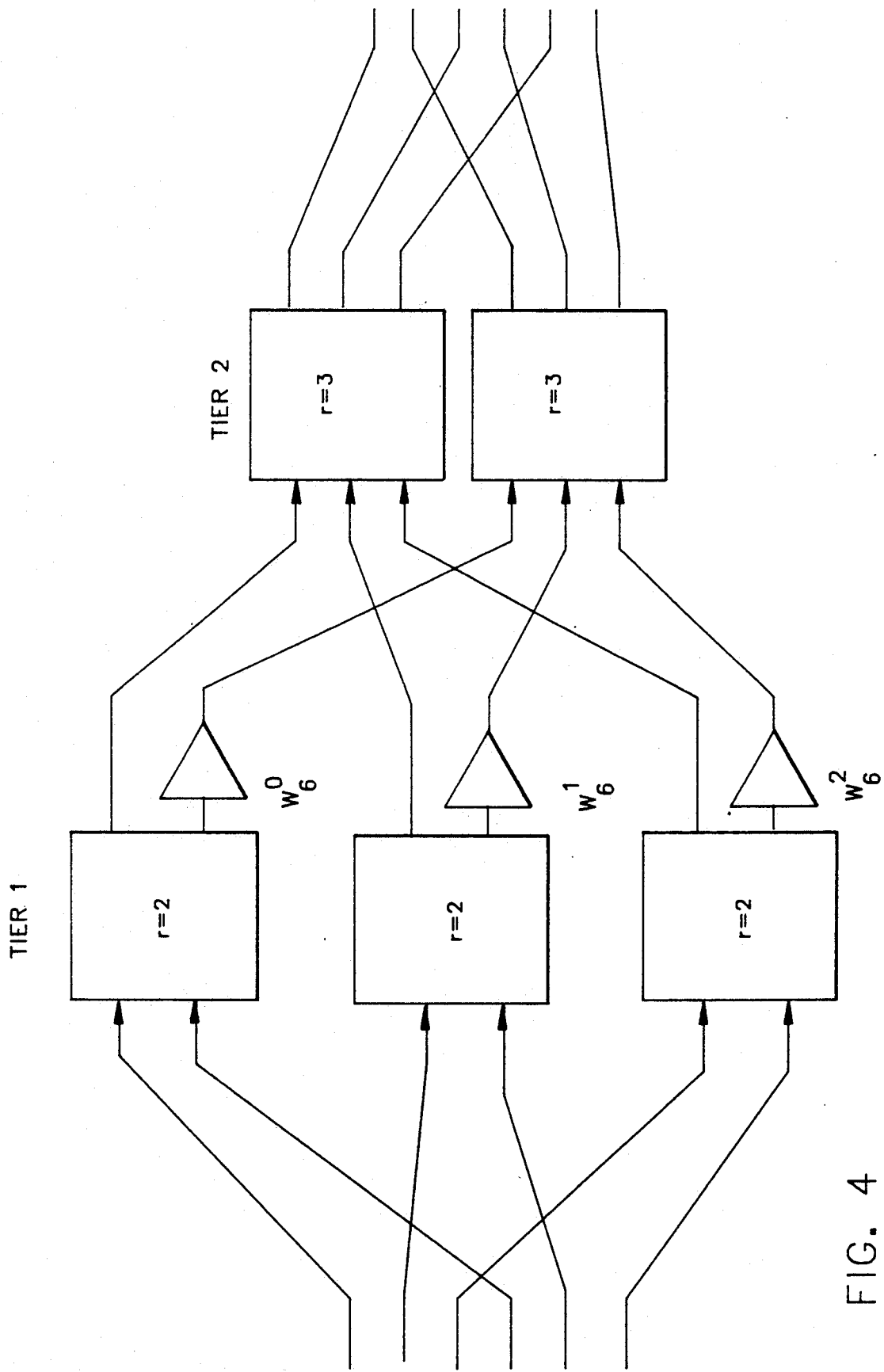
FIG. 4 illustrates the functional operation of a multiplier free radix-6 DFT.

Exemplary functional multiplication free structures for radix-2, radix-3, and radix-6, DFTs are illustrated in FIGS. 2, 3, and 4, using real and imaginary data values in accordance with the derivations discussed below.

For a Radix-2 transformation the above equations (2, 3) become:

$$X_k = \sum_{n=0}^{1} W_2^{nk} x_n = \sum_{n=0}^{1} (-1)^{nk} x_n = x_0 + (-1)^k x_1 \quad [W_2 = e^{-j2\pi/2} = -1]$$

with
$X_0 = (x_{0r} + x_{1r}) + j(x_{0i} + x_{1i})$, and
$X_1 = (x_{0r} - x_{1r}) + j(x_{0i} - x_{1i})$ which requires four real adds or summations to implement, as shown in FIG. 2.

A Radix-3 transformation is expressed as:

$$X_k = \sum_{n=0}^{2} W_3^{nk} x_n \quad [W_3 = e^{-j2\pi/3}]$$

Since $W_3^3=1$ and $W_3\neq 1$, it can be shown that $W_3^2=-1-W_3$. If the complex data samples are conventionally defined as: $x_n = x_{nR} + jx_{nI}$, then a new coordinate system, referred to as the skew-complex coordinate system $(1,W_3)$, which is non-orthogonal can be defined as shown in FIG. 5b. Data in the new coordinate system is expressed in the form $y_{nR} + W_3 y_{nI}$ and the relationships between data are described by the expressions:

$$\begin{aligned} x_n &= x_{nR} + jx_{nI} \\ &= y_{nR} + W_3 y_{nI} \\ &= (y_{nR} - \tfrac{1}{2}y_{nI}) - j\sqrt{3}/2\,(y_{nI}) \end{aligned}$$

which provides for transformations between the conventional coordinate system $(1,W_1)$, shown in FIG. 5a, and the skew-complex system $(1,W_3)$ of:

$$\begin{bmatrix} y_{nR} \\ y_{nI} \end{bmatrix} = \begin{bmatrix} 1 & -1/\sqrt{3} \\ 0 & 2/\sqrt{3} \end{bmatrix} \begin{bmatrix} x_{nR} \\ x_{nI} \end{bmatrix}$$

and $$\begin{bmatrix} x_{nR} \\ x_{nI} \end{bmatrix} = \begin{bmatrix} 1 & -1/2 \\ 0 & -\sqrt{3}/2 \end{bmatrix} \begin{bmatrix} y_{nR} \\ y_{nI} \end{bmatrix}$$

The complex multiplication $(a+bW_3)(c+dW_3)$, required for transformation, reduces to:

$$ac + W_3(ad+bc) + W_3^2 bd = (ac-bd) + W_3\cdot[(a+b)(c+d)-ac-2bd].$$

and results in three real multiples, two real additions three real subtractions, and one phase shift (to double the bd product). Conjugation for the phase shift can be expressed as:

$$(a+bW_3)^* = a + bW_3^{*} = a + bW_3^2 = a + b(-1-W_3) = (a-b) - bW_3$$

Therefore, the radix-3 DFT operation is accomplished without any multiplies and is formed from the expressions:

$$\begin{aligned} X_0 &= (x_{0r} + x_{1r} + x_{2r}) + j(x_{0i} + x_{1i} + x_{2i}) \\ &= (y_{0r} + y_{1r} + y_{2r}) + W_3(y_{0i} + y_{1i} + y_{2i}), \\ \text{and} \\ X_1 &= (y_{0r} - y_{1i} - y_{2r} + y_{2i}) + W_3(y_{0i} + y_{1r} - y_{2r} - y_{1i}), \\ \text{and} \\ X_2 &= (y_{0r} - y_{1r} + y_{1i} + y_{2i}) + W_3(-y_{1r} + y_{0i} + y_{2r} - y_{2i}) \end{aligned}$$

which requires as little as fourteen real adds or summations to implement, as illustrated in FIG. 3.

For a Radix-4 transformation the above expressions become:

$$X_k = \sum_{n=0}^{3} W_4^{nk} x_n = \sum_{n=0}^{3} (-j)^{nk} x_n \quad [W_4 = e^{-j2\pi/4} = -j]$$

with:
$$\begin{aligned} X_0 &= x_0 + x_1 + x_2 + x_3 = (x_0 + x_2) + (x_1 + x_3) = \\ &\quad [(x_{0r} + x_{2r}) + (x_{1r} + x_{3r})] + j[(x_{0i} + x_{2i}) + (x_{1i} + x_{3i})], \\ X_1 &= [(x_{0r} - x_{2r}) + (x_{1i} - x_{3i})] + j[(x_{0i} - x_{2i}) - (x_{1r} - x_{3r})], \\ X_2 &= [(x_{0r} + x_{2r}) - (x_{1r} + x_{3r})] + j[(x_{0i} + x_{2i}) - (x_{1i} + x_{3i})], \\ \text{and} \\ X_3 &= [(x_{0r} - x_{2r}) - (x_{1i} - x_{3i})] + j[(x_{0i} - x_{2i}) + (x_{1r} - x_{3r})] \end{aligned}$$

The axial relationships for the radix-4 coordinate system $(1,W_4)$ are shown in FIG. 5c.

The extension of the radix-3 twiddle factors and their negatives can be used to develop a radix-6 coordinate system and resulting equations for transformations. The coordinate system $(1,W_6)$ is shown in FIG. 5d and the expansion equations below.

$$X_k = \sum_{n=0}^{5} W_6^{nk} x_n \quad [W_6 = e^{-j2\pi/6}]$$

with $$\begin{aligned} X_0 &= (y_{0r} + y_{1r} + y_{2r} + y_{3r} + y_{4r} + y_{5r}) + \\ &\quad W_3(y_{0i} + y_{1i} + y_{2i} + y_{3i} + y_{4i} + y_{5i}), \\ X_1 &= (y_{0r} + W_6 y_{1r} + W_6^2 y_{2r} + W_6^3 y_{3r} + W_6^4 y_{4r} + W_6^5 y_{5r}) + \\ &\quad W_3(y_{0i} + W_6 y_{1i} + W_6^2 y_{2i} + W_6^3 y_{3i} + W_6^4 y_{4i} + W_6^5 y_{5i}), \\ &= (y_{0r} + y_{1r} - y_{1i} - y_{2i} - y_{3r} - y_{4r} + y_{4i} + y_{5i}) + \\ &\quad W_3(y_{0i} + y_{1r} + y_{2r} - y_{2i} - y_{3i} - y_{4r} - y_{5r} + y_{5i}), \\ X_2 &= (y_{0r} - y_{1i} - y_{2r} + y_{2i} + y_{3r} - y_{5r} + y_{5i}) + \\ &\quad W_3(y_{0i} + y_{1r} - y_{1i} - y_{2r} + y_{3i} + y_{4r} - y_{4i} - y_{5r}), \\ X_3 &= (y_{0r} - y_{1r} + y_{2r} - y_{3r} + y_{4r} - y_{5r}) + \\ &\quad W_3(y_{0i} - y_{1i} + y_{2i} - y_{3i} + y_{4i} - y_{5i}), \\ X_4 &= (y_{0r} + y_{1r} + y_{1i} + y_{2i} + y_{3r} + y_{4r} + y_{4i} + y_{5i}) + \\ &\quad W_3(y_{0i} - y_{1r} + y_{2r} - y_{2i} + y_{3i} - y_{4r} + y_{5r} - y_{5i}), \end{aligned}$$

and $$\begin{aligned} X_5 &= (y_{0r} + y_{1i} - y_{2r} + y_{2i} - y_{3r} + y_{5r} - y_{5i}) + \\ &\quad W_3(y_{0i} - y_{1r} + y_{1i} - y_{2r} - y_{3i} + y_{4r} - y_{4i} + y_{5r}); \end{aligned}$$

which requires as little as forty-one real adds or summations to implement (12 in the first tier, 28 for the second tier, and 1 for the twiddle-factors).

The mechanization of the multiplication free radix-6 DFT processor is illustrated in FIG. 4 using a two tier structure with three radix-2 FFT processors in a first "input" tier and two radix-3 FFT processors in a second "output" tier. Alternatively, the radix-6 processor could be constructed using radix-3 processors in the first tier and radix-2 in the second. For purposes of clarity, the illustration of FIG. 4 uses complex data paths (instead of separate real and imaginary lines as in FIGS. 2 and 3) and shows three complex twiddle factor multiplications on the outputs of the first tier of FFT elements. However, the first multiplication factor reduces to unity, the second to $1+W_3$, and the third to $W_3$. Therefore, these products, employing data in the $a+W_3 b$ format, become $a+W_3 b$, $(a-b)+W_3 a$, and $-b+W_3(a-b)$, respectively. It is readily understood that the $W_3$ portion of these products (and the factors) represents a selection of the $W_3$ portion of the data, a specified output line, and not an actual multiplication.

Figure 6:
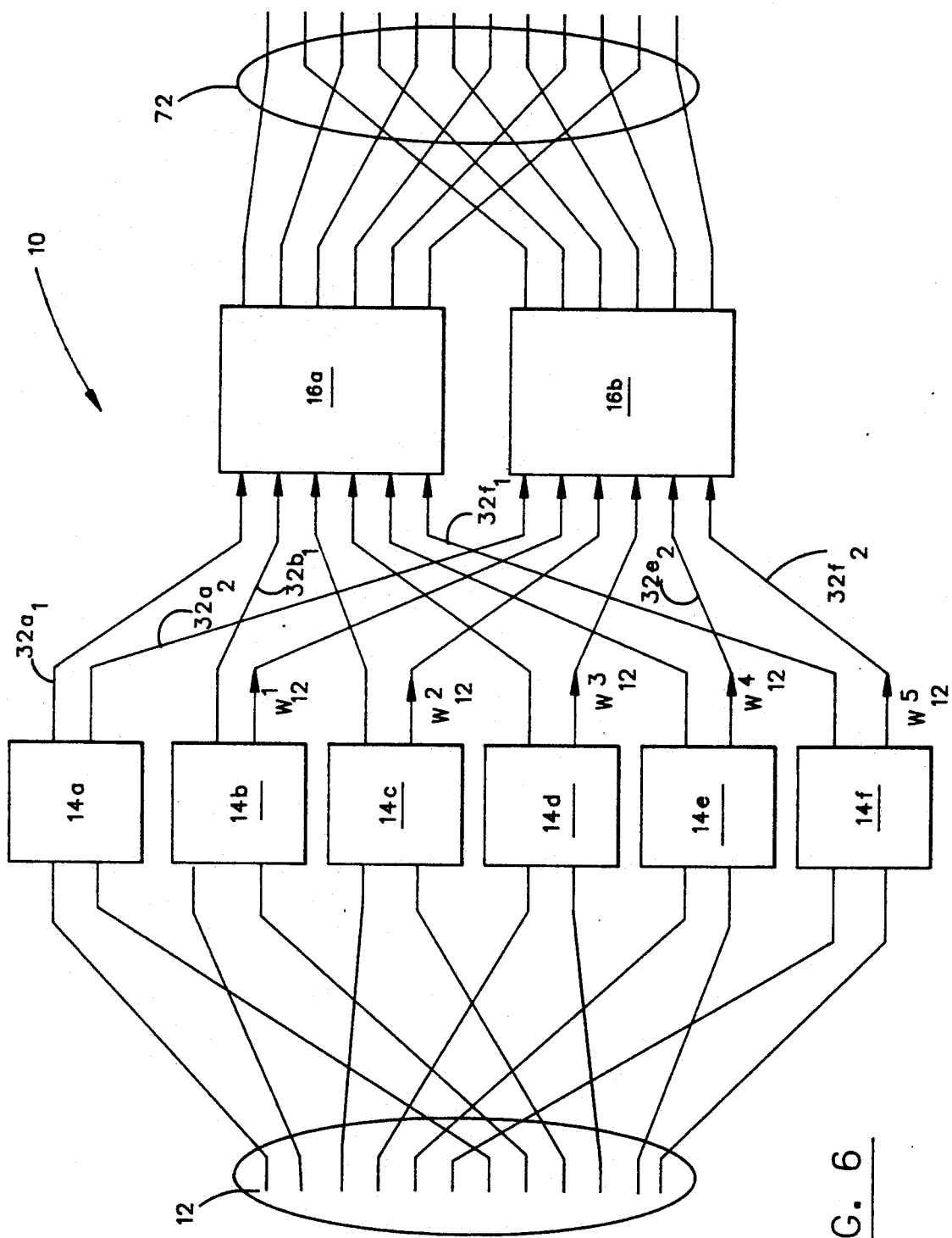
FIG. 6 illustrates an overview of a radix-12 FFT apparatus constructed according to the principles of the present invention.
Figure 7:
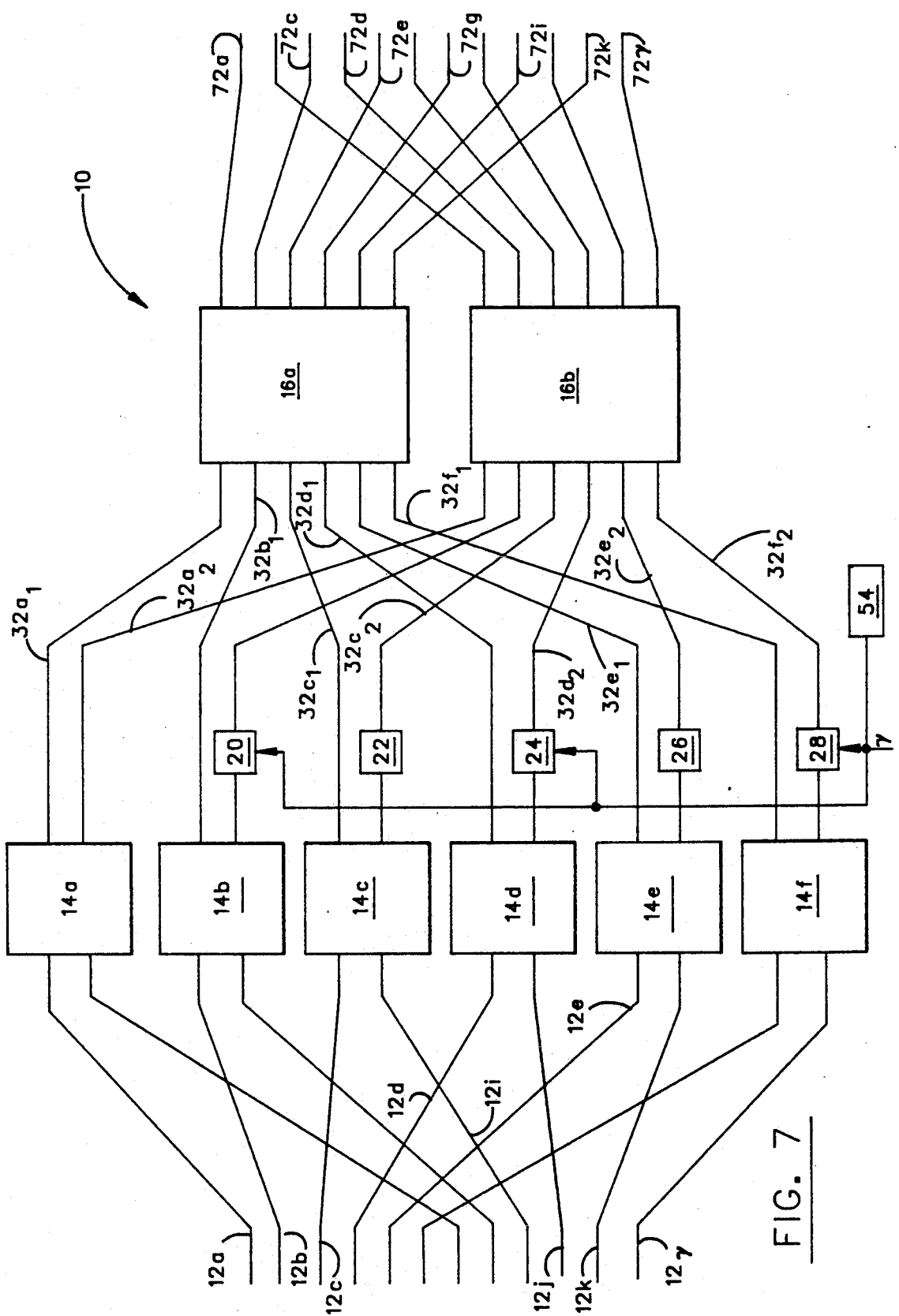
FIG. 7 illustrates an overview of a multiplier-minimized 12-point DFT using a radix-2 input tier.
Figure 8:
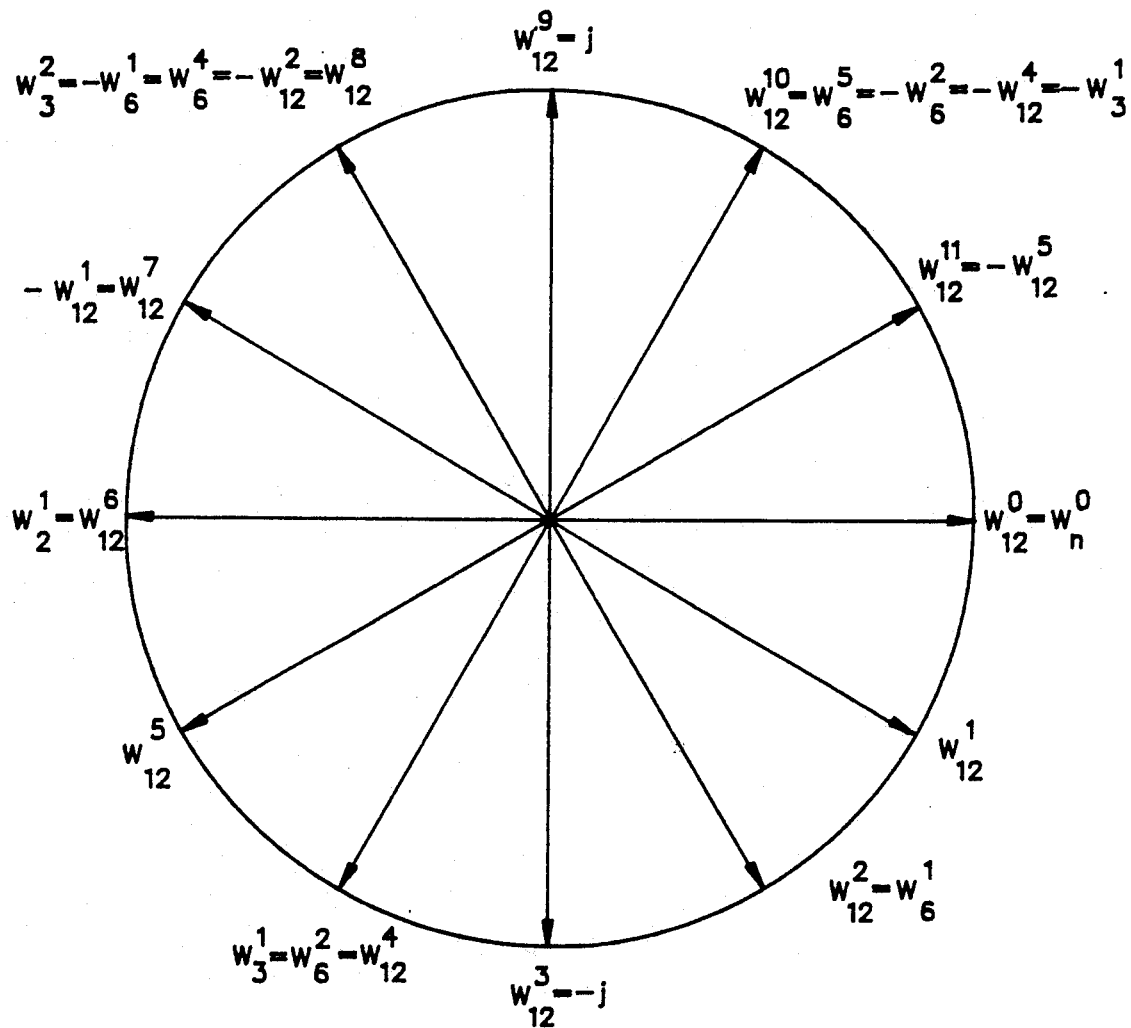
FIG. 8 illustrates the relationship for axes for a radix-12 system.

Using the above relationships for decomposition as a guide, a preferred embodiment of the invention was developed. The preferred embodiment of a modular FFT processor constructed and operating according to the present invention is illustrated in FIGS. 6 and 7. The device shown in the figures is a dedicated functional component or processor for performing a radix-12 FFT algorithm. A brief illustration of the relationship of the radix-12 axes to the radix-3 and radix-6 axes is also provided in FIG. 8 to clarify the radix-12 operations.

In FIGS. 6 and 7, an FFT processor 10 transfers incoming data from one of a variety of known data perprocessors, receivers, memory devices, or buffers (not shown) to the twelve input lines 12 (12a–12l). Data is typically received as multi-bit words with half of the bits being assigned (or reserved) to the real portion of a data point and the remainder being reserved for the imaginary portion. The data is typically gathered (collected) using different data transfer or storage busses for the imaginary and real data. That is, the data is collected as a complex input signal with a real, or in-phase component, and a 90 degree out of phase quadrature signal which represents the imaginary portion of the data. Therefore, the input lines 12, and other data paths, in FIG. 7 each represent 2-bit or 2-signal wide parallel input lines, or alternatively, complex data paths in which the real and imaginary data is transferred on one input line and then separated within the tiers of FFT processors.

The data can be pre-stored and transferred from memory elements such as a series of memory registers or RAM circuitry. Those skilled in the art are familar with a variety of data storage and transfer elements and these functions are not described in further detail here. Additional information can be obtained from various textual works or earlier filed U.S. patent application Ser. No. 07/549,041, assigned to the same assignee, now U.S. Pat. No. 5,093,801.

Where applicable, the input data can also be reformatted by connecting an input line formatting register in series with the signal-input lines to convert input data received in either serial or parallel format into a desired parallel format for processing. An output formatting register connected in series with the signal-output lines can be used to convert output data from parallel format to either desired serial or parallel formats. The input data may be generated in a conventional orthogonal format or in the nonorthogonal $(1,W_3)$ format. Similarly, output data may be acceptable in a conventional orthogonal format or in a nonorthogonal $(1,W_3)$ format, depending upon the interface specification. If the signal source uses a conventional orthogonal format, the data is first transformed to a skew-complex $(1,W_3$ or $1,W_{12})$ format or coordinate system.

The data, here illustrated as complex data, is decomposed into six ordered pairs which are each transferred into one of six radix-2 FFT elements 14 (14a, 14b, 14c, 14d, 14e, and 14f). The output of each of these elements is the same as illustrated in FIG. 2a above. The outputs from all of the first tier radix-2 processing elements 14 are transferred as two ordered sets of data to each of two radix-6 FFT processing elements 16 (16a and 16b). The operation of these elements is the same as illustrated in FIG. 5 above.

The output of the radix-2 elements on the output lines or buses, $32n_x$ ($n=a, \ldots, f$; $x=1,2$), would normally be adjusted using complex twiddle-factor multiplications on each transfer line or bus. However, from equations 2 and 3, above, and looking at the illustration of FIG. 1, it is readily seen that the first or zeroth order output line, $32n_1$, from each of the radix-2 elements 14 uses a unity twiddle-factor value. Therefore, no multiplication operations take place on the radix-2 output lines $32a_1$, $32b_1$, $32c_1$, $32d_1$, $32e_1$, and $32f_1$. The remaining twiddle factors are applied to the second radix-2 output lines $32b_2$, $32c_2$, $32d_2$, $32e_2$, and $32f_2$, by a series of factor elements 20, 22, 24, 26, and 28, respectively. These factors are generated using the traditional relationship:

$$W_N{}^n = \cos 2\pi n/N - j \sin 2\pi n/N$$

which, for a radix 12 operation with N=12, becomes:

$$W_{12}{}^n = \cos 2\pi n/12 - j \sin 2\pi n/12$$

The zeroth order value for the second output line $32a_2$ from the first radix-2 element is also unity and no multiplication operation is required. The only multiplications to be implemented are for second order output lines from the second (14b), third (14c), fourth (14d), fifth (14e), and sixth (14f) elements 14.

It has been discovered that the twiddle-factor expression for each of these outputs can be re-expressed in the form:

$$W_{12}{}^n = \alpha(n) + \beta(n)W_3$$

where $\alpha(n) = \cos \pi n/6 + 1/\sqrt{3} \sin \pi n/6$
and $\beta(n) = 2/\sqrt{3} \sin \pi n/6$.

The values for $\alpha(n)$ and $\beta(n)$ for the six radix-2 elements (n=0, 1, 2, 3, 4, and 5) are listed in Table I

TABLE I

| n | $\alpha(n)$ | $\beta(n)$ |
|---|---|---|
| 0 | 1 | 0 |
| 1 | $2\gamma$ | $\gamma$ |
| 2 | 1 | 1 |
| 3 | $\gamma$ | $2\gamma$ |
| 4 | 0 | 1 |
| 5 | $-\gamma$ | $\gamma$ | where $\gamma = 1/\sqrt{3}$ and is defined as a common factor having an approximate value of 0.577350269 which has been discovered as useful to reduce the mechanization of the multiplications. That is, where the input signal to the twiddle factor stage is in the complex form $a+bW_3$, the multiplication products can now be simplified and reduced using the above values to a minimum number of multiplication operations as shown in Table II below.

TABLE II

| n | Resulting Product $[(a\alpha - b\beta) + W_3(a\beta + b\alpha - b\beta)]$ | Multiplies | Adds | Shifts |
|---|---|---|---|---|
| 0 | $a + bW_3$ | 0 | 0 | 0 |
| 1 | $(2a - b)\gamma + (a + b)\gamma W_3$ | 2 | 2 | 1 |
| 2 | $(a + b) + aW_3$ | 0 | 1 | 0 |
| 3 | $(a - 2b)\gamma + (2a - b)\gamma W_3$ | 2 | 2 | 2 |
| 4 | $-b + (a - b)W_3$ | 0 | 1 | 0 |
| 5 | $-(a + b)\gamma + (a - 2b)\gamma W_3$ | 2 | 2 | 1 |

In the above table, the last column lists the number of shifts used to implement the factor of two or doubling required for some operations (where n=1, 3, 5). In typical signal processing applications, the data is manipulated in digital form and such a doubling is equivalent to simply shifting the digital data by one bit position. Therefore, these operations are expressed, and counted, as shifts as opposed to multiplications by a factor of two. Although multipliers could be used, this would be much less efficient.

As the above table indicates, the invention has resulted in a reduction in the number of multiplications to 6 real multiplications, and 4 shifts and 114 summations, in this form. In addition, the multiplier coefficient $\gamma$ can be decomposed into a canonical signed digit coded (CSDC) shift operation where:

$$\gamma = 0.577350269 = \{[2^{-1} + 2^{-4} + 2^{-10} + 2^{-15}] - [2^{-6} + 2^{-13}]\};$$

which further reduces the six multiplications to additional shift operations to create a multiplication free operation where the shifting circuitry can be accommodated.

Figure 15:
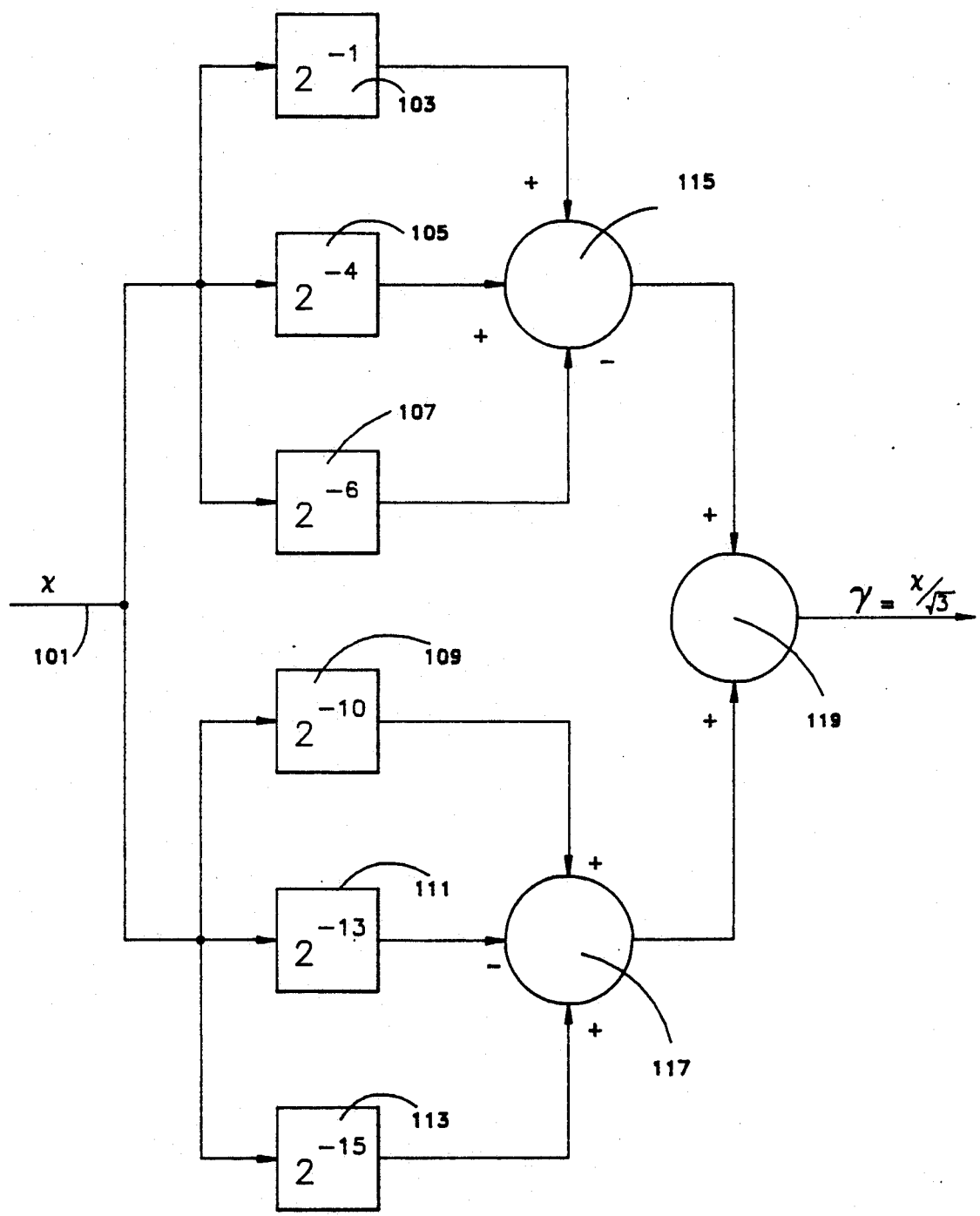
FIG. 15 is a block diagram of shifting circuitry for creating multiplication free addition by substituting shifting operations.

FIG. 15 shows a conventional shift and add circuit for carrying out the calculation for $\gamma$ (gamma) by addition to eliminate all multiplication steps. Any signal $\chi$, to be scaled, is applied to input lead 101 for application to shifters 103, 105, 107, 109, 111 and 113, according to the formula for $\gamma$ set forth below Table II. The upper adder 115 receives the shifted output of shifters 103 and 105, as positive inputs, with the output of shifter 107 being a negative input. Similarly, adder 117 receives the positive outputs of shifters 109 and 113 and the negative output of shifter 111. Then, final adder 119 receives the positive outputs of adders 115 and 117 to provide $\gamma\chi=\chi/\sqrt{3}$, thus eliminating the final 6 real multiplications.

The reduction of the complex multiplications into a smaller number of real multiplications and appropriate apparatus for realizing these operations, is illustrated in further detail in the radix-12 processor overview of FIG. 7. Exemplary structures for constructing the five factor elements 20, 22, 24, 26, and 28, used to effect summations and multiplications as indicated in Table II above, are illustrated in FIGS. 9—13.

Figure 9:
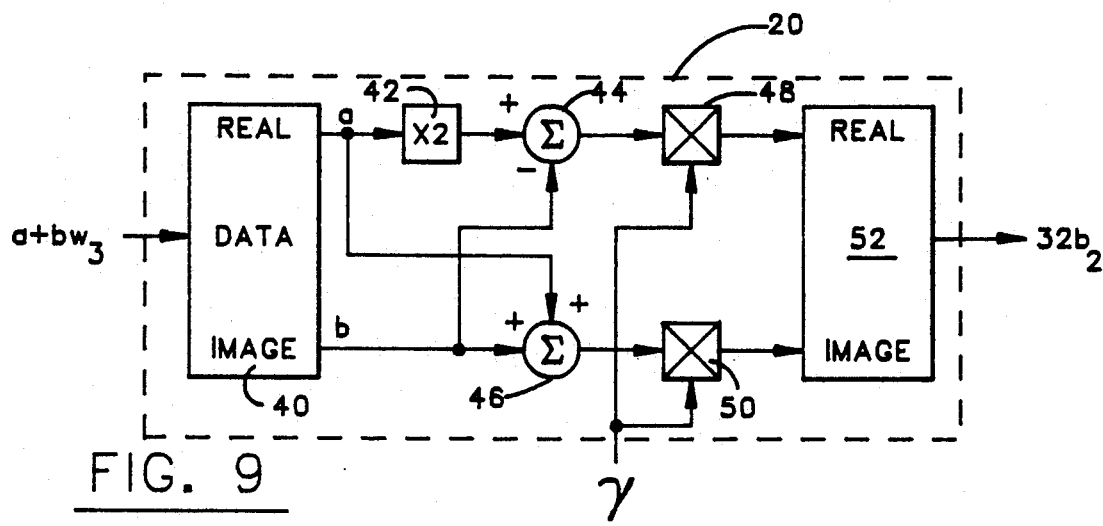
FIGS. 9, 10, 11, 12 and 13 illustrate exemplary twiddle-factor elements for use in the apparatus of FIGS. 7, 8, and 14.

In FIG. 9, the input complex signal to the factor element 20 is separated into the real and imaginary values in a separation element 40. Such elements are well known in the art, as where the input signal is divided into an in phase and quadrature signals or where an input digital signal uses a first set of bits to indicate the real data and a second set of bits to represent the imaginary data and the division simply requires separation of the sets of bits. A dedicated doubling element 42 doubles the real portion by a factor of two and transfers the product to a first adder 44 where the imaginary portion is subtracted. The doubling element 42 is typically implemented as a digital data shifter which uses a one place shift of the input data values to achieve the desired factor of two increase. Otherwise, a multiplier is required for this latter operation, which is less efficient.

At the same time, the real and imaginary values are added in a second summation element 46. The addends for each adder are transferred to a corresponding multiplier, 48 or 50 in which the value of $\gamma$ is applied. Since the value of $\gamma$ is the reciprocal or inverse of the square root of three, the elements 48 and 50 could also be implemented using division circuitry to divide addends by the square root of three. However, this is less efficient and, therefore, not preferred.

The value for $\gamma$ can either be prestored or hardware programmed into the operation of each multiplier, or provided from an external source, such as a changeable or selectable memory element 54. The output of the multiplier 48 represents the real portion and the output of the multiplier 50 represents the imaginary portion of the complex data being transferred over the line or bus $32b_2$.

Figure 11:
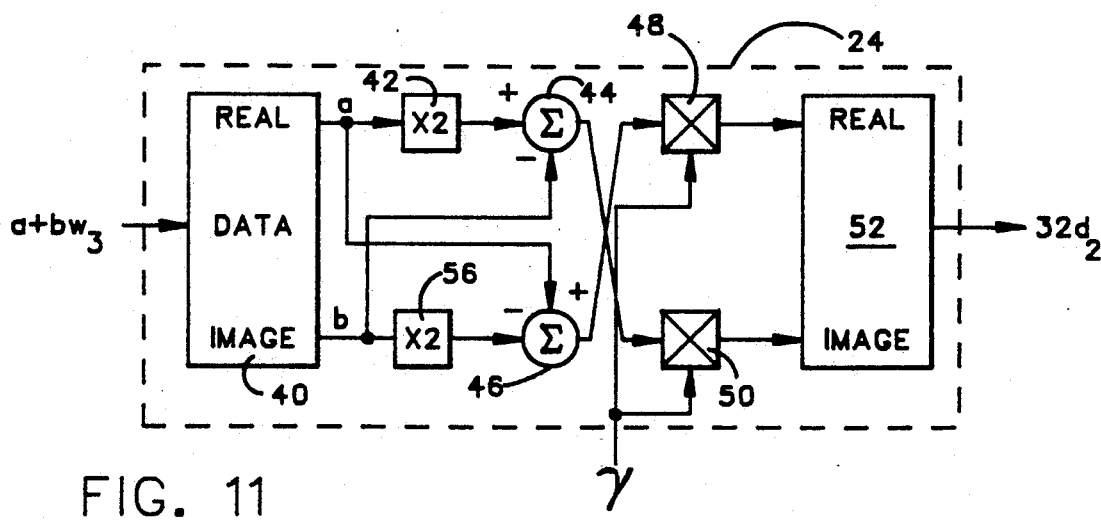

In FIG. 11, the factor element 24 is shown using the same basic structure as that of the factor element 20. However, the imaginary data, b, is doubled or increased by a factor of two before being subtracted from the real portion, a, and the outputs of the summation elements or adders 44 and 46 or, alternatively the multipliers 48 and 50, are reversed to provide the real and imaginary output data on the line $32d_2$.

Figure 13:
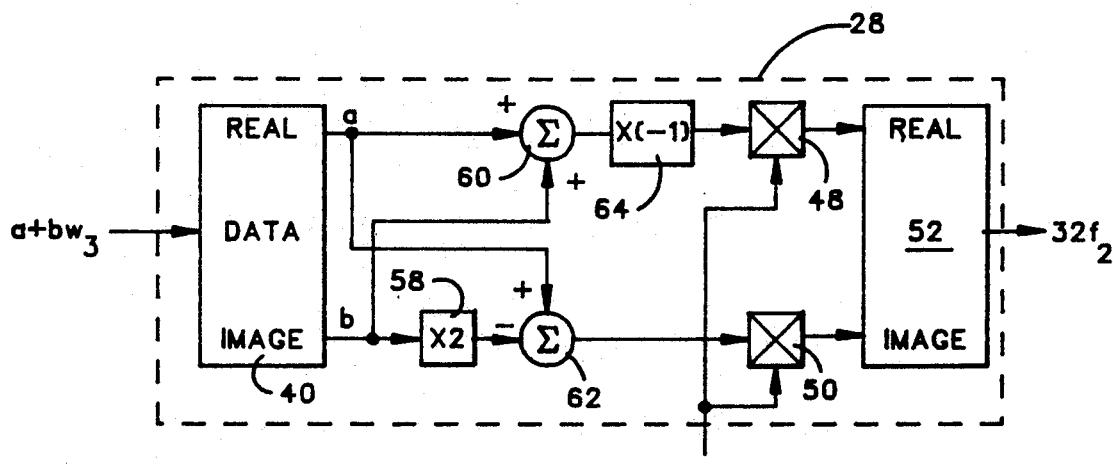

In FIG. 13, the factor element 28 is again similar to the factor element 20 except that the real and imaginary data portions are added in an adder 60 to provide the real output data, the negative of which is multiplied by $\gamma$ in the multiplier 48 to provide the real data portion. At the same time, the imaginary data, b, is doubled prior to being subtracted from the real data portion in an adder 62. The output of the adder 62 is transferred to the multiplier 50 where it is multiplied by $\gamma$ and forms the imaginary portion of the output transferred on the data line $32f_2$.

Figure 10:
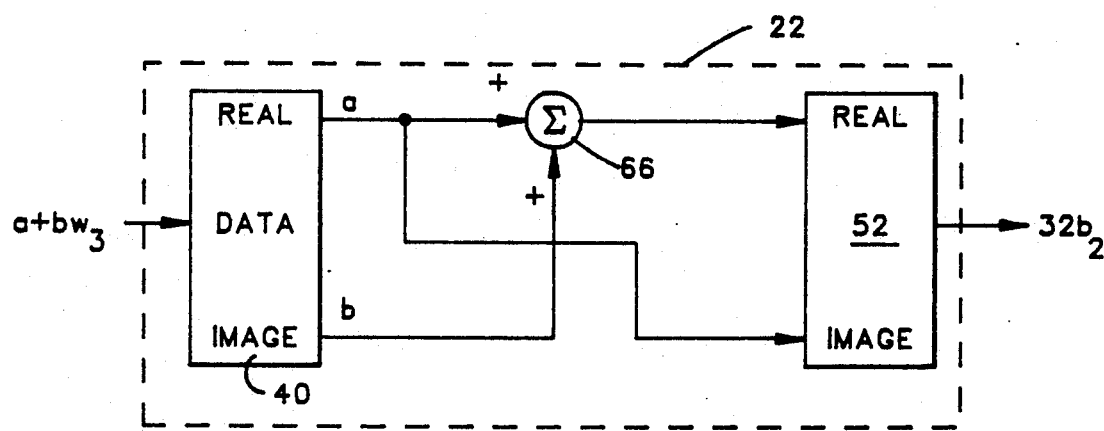
Figure 12:
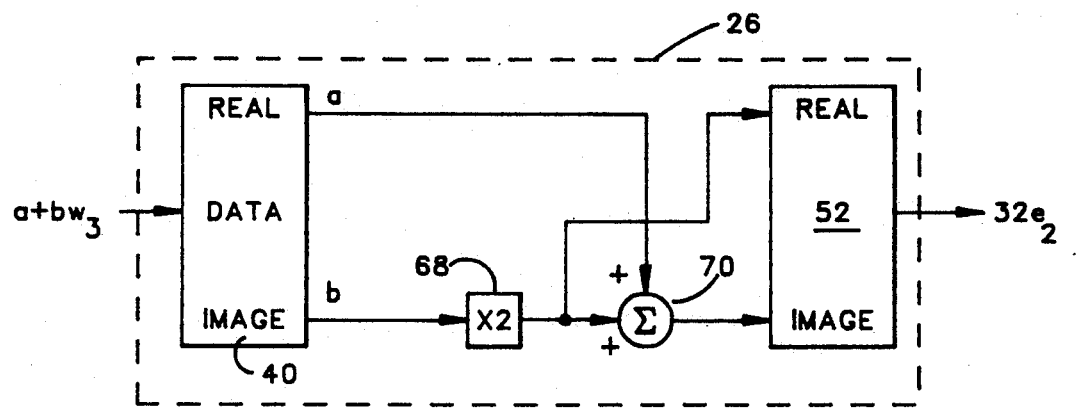

In FIG. 10, the factor element 22 is implemented by transferring the real data, a, directly to the imaginary output, while both the real and imaginary data portions are summed in an adder 66 to form the real portion of the output on the data line $32c_2$. In FIG. 12, the factor element 26 is implemented by taking the negative of the imaginary data, b, and then transferring it directly to the real output. Both the real and negative of the imaginary data portions are also summed in an adder 70 to form the imaginary portion of the output on the data line $32e_2$.

Returning to FIG. 8, the complex data on the lines $32a_1$-$32f_1$ are transferred to the first radix-6 FFT processor element 16a while the data on the lines designated $32a_2$-$32f_2$ is all input to the second radix-6 processor 16b. The two processors 16a and 16b perform multiplier free transformation operations, as known in the art, and generate the appropriate output data which is transferred in an interleaved fashion, between the two processors, to the output lines or buses 72a-72l.

Those skilled in the art will readily understand that other forms of positive and negative summation and multiplication elements can be employed to accomplish the operations required for the factor elements 20, 22, 24, 26, and 28. However, the above examples illustrate the basic mechanization made possible by the invention which reduces the number of multiplications required. Where timing permits in a given application, the multipliers for the factor elements can be reduced to fewer time shared components through the use of output selection or switching elements, which also reduces the circuitry required for the radix-12 structure.

It will also be apparent to those skilled in the art that the use of separation and combination elements 42 and 52 in the factor elements 20-28 are by way of illustration only and that these elements are not required when the input lines 12a-12l and other data lines are configured as separate, or separated, real and imaginary data buses.

Figure 14:
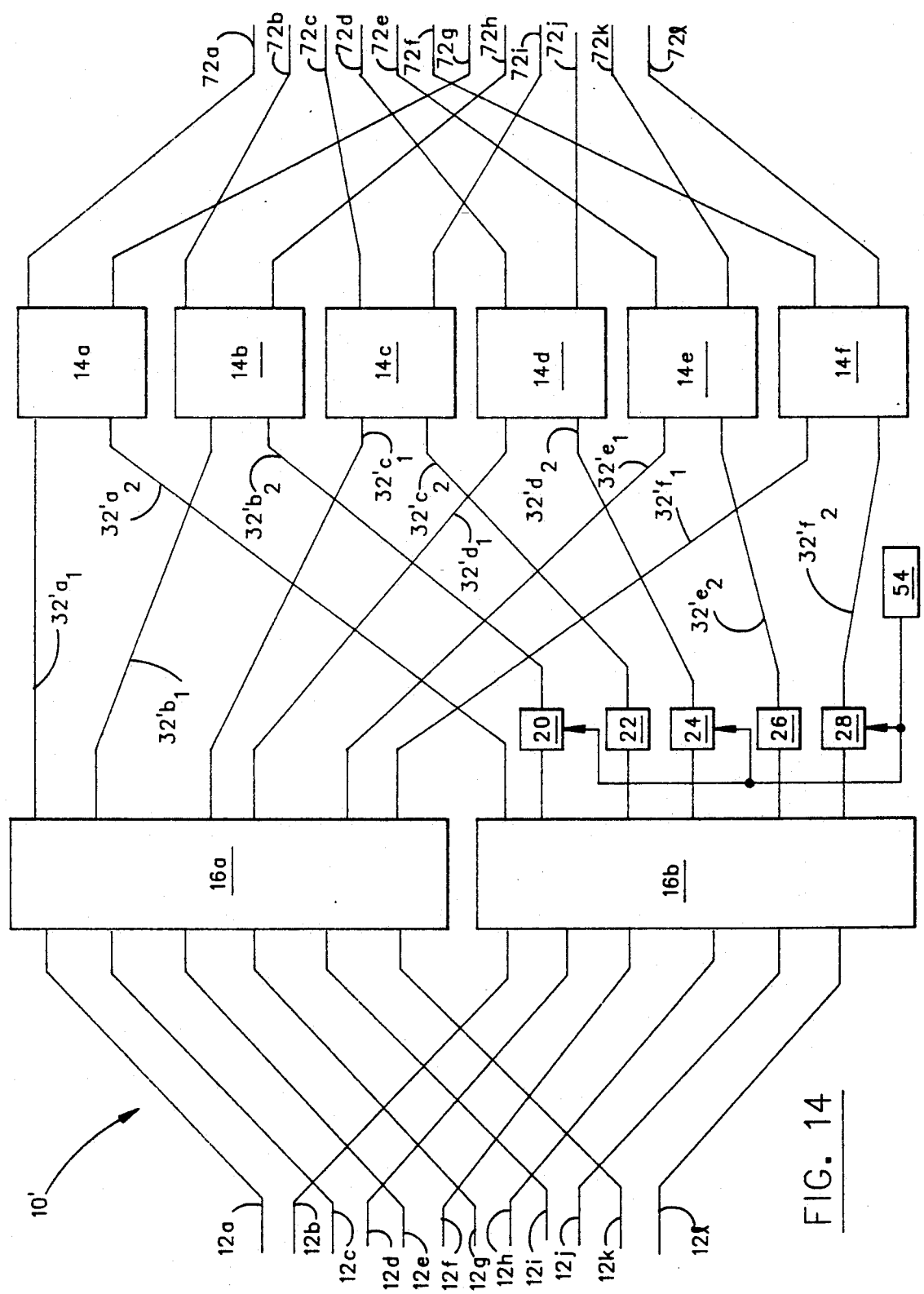
FIG. 14 illustrates an overview of a multiplier-minimized 12-point DFT using a radix-6 input tier.

As previously discussed, in some applications it may be more appropriate or advantageous to first process the incoming data in the two radix-6 FFT processors and then the six radix-2 FFT processors. FIG. 14 illustrates an alternate form of the radix-12 processor 10, here labeled 10', in which the first processing tier comprises the radix-6 FFT processors 16a and 16b and the second tier comprises the radix-2 FFT processors 14a-14f.

In FIG. 14, the input, complex, data buses 12 (12a-12l) are connected to provide two sets of inputs, one for each of the FFT processors 16a or 16b. As would be known to those skilled in the art, in this configuration every other input line 12 (12a, 12c, 12e, 12g, 12i, 12k) is connected to one processor 16 (16a) and the remaining input lines 12 (12b, 12d, 12f, 12h, 12j, 12l) are connected to the second processor 16 (16b). By the same token, on the output side of the processor 10', the output lines 72 (72a–72l) from the radix-2 processors 14a–14f are connected in an interleaved fashion so that each processor 14 provides one of the first six output values (72a–72f) and then one of the second six output values (72g–72l). As in the processor 10, the twiddle-factor elements 20–28 operate only on the outputs of the lower radix-6 processor 16b outputs and then only on the last five output lines. The operation of these elements is the same as before.

What has been described then is a new method and apparatus for performing radix-12 transforms at very high speed with low complexity and manufacturing cost. The apparatus of the present invention provides greatly improved processing efficiency and with very low power consumption which meets or exceeds the processing requirements for for many advanced signal processing applications. A single device is capable of performing a 12-point FFT and can be combined with other FFT processors to more efficiently decompose larger FFT processes.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A radix-12 Fast Fourier Transform (FFT) processor for performing a preselected 12-point FFT algorithm, comprising:

first, second, third, fourth, fifth, and sixth radix-2 Direct Fourier Transformation (DFT) means for performing radix-2 direct Fourier transformations on two of twelve complex data points;

each DFT means having first and second data transfer lines, each complex data point a real portion and an imaginary portion;

first radix-6 Direct Fourier Transformation means for performing radix-6 direct Fourier transformations on six complex data points, being connected by six first data transfer lines one to each of said radix-2 DFT means;

second radix-6 Direct Fourier Transformation means for performing radix-6 direct Fourier transformations on six complex data points, being connected by six second data transfer lines one to each of said radix-2 DFT means;

first twiddle factor means connected in series with said second radix-2 DFT second transfer line for adjusting complex data points transferred thereon by providing twice the real minus the imaginary portions of complex input data decreased by a factor of the square root of three as real output data, and providing the sum of the real and imaginary input data decreased by the square root of three as imaginary output data;

second twiddle factor means connected in series with said third radix-2 DFT second transfer line for adjusting complex data transferred thereon by providing the sum of the real and imaginary input data as real output data, and by transferring the real input data as imaginary output data;

third twiddle factor means connected in series with said fourth radix-2 DFT second transfer line for adjusting complex data transferred thereon by providing the real data minus twice the imaginary input data decreased by a factor of the square root of three as real output data, and providing twice the real data minus the imaginary input data decreased by the square root of three as imaginary output data;

fourth twiddle factor means connected in series with said fifth radix-2 DFT second transfer line for adjusting complex data transferred thereon by transferring the negative of imaginary input data as real output data, and by providing the real minus the imaginary input data as imaginary output data; and fifth twiddle factor means connected in series with said sixth radix-2 DFT second transfer line for adjusting complex data transferred thereon by providing the negative of the sum of the real and imaginary input data decreased by a factor of the square root of three as real output data, and providing the real minus twice the imaginary input data decreased by the square root of three as imaginary output data.

2. The FFT processor of claim 1 wherein said radix-2 and radix-6 DFT means are configured as multiplication free Fourier transformations.

3. The FFT processor of claim 1 wherein said radix-2 DFT means are configured to receive twelve complex input data points, and said radix-6 DFT means receive complex output data from said radix-2 DFT means and said twiddle-factor means and generate twelve complex output data points.

4. The FFT processor of claim 1 wherein said radix-6 DFT means are configured to receive twelve complex input data points, and said radix-2 DFT means receive complex output data from said radix-6 DFT means and said twiddle-factor means and generate twelve complex output data points.

5. The FFT processor of claim 1 wherein said first, third, and fifth twiddle factor means each comprises multiplication means for multiplying addends by a factor of the reciprocal of the square root of three.

6. The FFT processor of claim 1 wherein said first, third, and fifth twiddle factor means each comprises canonical signed data shifting means for applying a shift to addends of sufficient magnitude to decrease them by a factor of the square root of three.

7. The FFT processor of claim 1 wherein said first, third, and fifth twiddle factor means each comprises a first digital data shifting means for applying a one place shift to appropriate real and imaginary input data values to achieve said factor of two increase as required.

8. The FFT processor of claim 1 wherein said first twiddle factor means comprises:

doubling means for receiving and increasing the value of a real portion of said complex input data by a factor of two;

first summation means for receiving and subtracting an imaginary portion of said complex input data from the output of said doubling means;

first multiplication means connected to said first summation means for forming the product of the inverse of the square root of three and said first summation means output so as to form the real portion of output data;

second summation means for summing of the real and imaginary portions of the input; and second multiplication means connected to said second summation means for forming the product of the inverse of the square root of three and said second summation means output so as to form the imaginary portion of output data.

9. The FFT processor of claim 1 wherein said second twiddle factor means comprises:

third summation means connected to receive and sum the real and imaginary portions of complex input data so as to form the real portion of output data; and first transfer means for receiving and transferring the real portion of input data as an imaginary portion of output data.

10. The FFT processor of claim 1 wherein said third twiddle factor means comprises:

second doubling means for receiving and increasing the value of an imaginary portion of said complex input data by a factor of two;

fourth summation means for receiving and subtracting the output of said second doubling means from the real portion of said complex input data;

third multiplication means for generating the product of the reciprocal of the square root of three and the output of the fourth summation means so as to form the real output data;

third doubling means for receiving and increasing the value of a real portion of said complex input data by a factor of two;

fifth summation means for receiving and subtracting an imaginary portion of said complex input data from the output of said third doubling means; and fourth multiplication means for generating the product of the reciprocal of the square root of three and the output of the fifth summation means so as to form the imaginary output data.

11. The FFT processor of claim 1 wherein said fourth twiddle factor means comprises:

second transfer means for transferring the negative of the imaginary portion of complex input data as real output data; and sixth summation means for subtracting imaginary input data from real input data so as to form the imaginary output data.

12. The FFT processor of claim 1 wherein said fifth twiddle factor means comprises:

seventh summation means for receiving and summing the real and imaginary portions of the complex input data;

negation means for forming the negative of the sum of said seventh summation means;

fifth multiplication means for forming the product of the reciprocal of the square root of three and the output of said negation means as a real portion of output data;

fourth doubling means for receiving and doubling the value of the imaginary portion of complex input data;

eighth summation means for receiving and subtracting the output of the fourth doubling means from the real portion of the complex input data; and sixth multiplication means for forming the product of the reciprocal of the square root of three and the output of said eight summation means as an imaginary portion of output data.

13. A method of performing a radix-12 fast Fourier transformation comprising the steps of:

providing a first, second, third, fourth, fifth, and sixth radix-2 Direct Fourier Transformation (DFT) processor for performing radix-2 direct Fourier transformations on two of twelve complex data points;

each DFT processor having first and second data transfer lines, each complex data point having a real portion and an imaginary portion;

providing a first radix-6 Direct Fourier Transformation processor for performing radix-6 direct Fourier transformations on six complex data points, and connecting it by six first data transfer lines one to each of said radix-2 DFT processor;

providing a second radix-6 Direct Fourier Transformation processor for performing radix-6 direct Fourier transformations on six complex data points, and connecting it by six second data transfer lines one to each of said radix-2 DFT processor;

adjusting complex data points transferred on said second radix-2 DFT second transfer line by a first twiddle factor amount by providing twice the real minus the imaginary portions of complex input data decreased by a factor of the square root of three as real output data, and providing the sum of the real and imaginary input data decreased by the square root of three as imaginary output data;

adjusting complex data transferred on said third radix-2 DFT second transfer line by a second twiddle factor amount by providing the sum of the real and imaginary input data as real output data, and by transferring the real input data as imaginary output data;

adjusting complex data transferred on said fourth radix-2 DFT second transfer line by a third twiddle factor amount by providing the real data minus twice the imaginary input data decreased by a factor of the square root of three as real output data, and providing twice the real data minus the imaginary input data decreased by the square root of three as imaginary output data;

adjusting complex data transferred on said fifth radix-2 DFT second transfer line by a fourth twiddle factor amount by transferring the negative of imaginary input data as real output data, and by providing the real minus the imaginary input data as imaginary output data; and adjusting complex data transferred on said sixth radix-2 DFT second transfer line by a fifth twiddle factor amount by providing the negative of the sum of the real and imaginary input data decreased by a factor of the square root of three as real output data, and providing the real minus twice the imaginary input data decreased by the square root of three as imaginary output data.

14. The method of claim 13 wherein said radix-2 and radix-6 DFT processor are configured to provide multiplication free Fourier transformations.

15. The method of claim 13 wherein said step of providing radix-2 DFT processor comprises the steps of configuring said radix-2 DFTs to receive twelve complex input data points, and configuring said radix-6 DFT processor to receive complex output data from said radix-2 DFT processor.

16. The method of claim 13 wherein said step of providing radix-6 DFT processor comprises the steps of configuring said radix-6 DFTs to receive twelve complex input data points, and configuring said radix-2

DFT processor to receive complex output data from said radix-6 DFT processor.

17. The method of claim 13 wherein said steps of adjusting input data by said first, third, and fifth twiddle factor amounts each comprises the step of multiplying addends by a factor of the reciprocal of the square root of three.

18. The method of claim 13 wherein said steps of adjusting input data by first, third, and fifth twiddle factor amounts each comprises canonical signed data shifting addends of sufficient magnitude to decrease them by a factor of the square root of three.

* * * * *